US007633856B2

(12) United States Patent
Ikawa (10) Patent No.: US 7,633,856 B2
(45) Date of Patent: Dec. 15, 2009

(54) MULTI-NODE SYSTEM, INTERNODAL CROSSBAR SWITCH, NODE AND MEDIUM EMBODYING PROGRAM

(75) Inventor: Yasuhiro Ikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 703 days.

(21) Appl. No.: 11/176,644

(22) Filed: Jul. 8, 2005

(65) Prior Publication Data

US 2006/0023625 A1 Feb. 2, 2006

(30) Foreign Application Priority Data

Jul. 27, 2004 (JP) .............................. 2004-218137

(51) Int. Cl.
*H04L 12/00* (2006.01)
(52) U.S. Cl. .................... 370/217; 370/360; 710/317
(58) Field of Classification Search ............... 370/220, 370/291, 380, 217, 360; 710/317
See application file for complete search history.

(56) References Cited

U.S. PATENT DOCUMENTS

| 4,497,054 | A | | 1/1985 | Read |
| 5,072,217 | A | * | 12/1991 | Georgiou et al. ........... 340/2.25 |
| 5,361,249 | A | | 11/1994 | Monastra et al. |
| 5,796,717 | A | | 8/1998 | Shinbashi et al. |
| 5,844,887 | A | | 12/1998 | Oren et al. |
| 6,035,414 | A | | 3/2000 | Okazawa et al. |
| 6,760,870 | B1 | * | 7/2004 | Snyder et al. ............... 714/712 |
| 2001/0030942 | A1 | * | 10/2001 | Suzuki ....................... 370/228 |
| 2003/0026249 | A1 | * | 2/2003 | Ikawa ........................ 370/360 |
| 2003/0142678 | A1 | | 7/2003 | Chan et al. |

FOREIGN PATENT DOCUMENTS

| EP | 1 132 815 A2 | 9/2001 |
| EP | 1 284 557 A2 | 2/2003 |
| JP | 1-49983 | 10/1989 |
| JP | 8-161277 | 6/1996 |
| JP | 2001-256203 | 9/2001 |
| JP | 2001-518665 | 10/2001 |
| JP | 2003-46526 | 2/2003 |

OTHER PUBLICATIONS

European Search Report dated Oct. 11, 2005.
Olson, et al., "Message routing in HARTS with faulty components", International Symposium on Fault Tolerant Computing, (FTCS) Chicago, Jun. 20-23, 1989, International Symposium on Fault Tolerant Computing Systems. (FTCS), Washington, IEEE Comp. Soc. Press, US, vol. Symp. 19, Jun. 21, 1989, pp. 331-338, XP010016721.
Japanese Office Action dated Jan. 10, 2007, with oartial english language translation.
Canadian Search Report dated Aug. 15, 2006.

* cited by examiner

*Primary Examiner*—Jayanti K Patel
*Assistant Examiner*—Matthew Campbell
(74) *Attorney, Agent, or Firm*—McGinn IP Law Group PLLC (57) ABSTRACT

A multi-node system for making the data transfer between nodes via each internodal crossbar switch comprises a plurality of internodal crossbar switches having a switch for transmitting the transfer data from a plurality of nodes to the node of transfer destination. If a fault occurs in the switch, the system is configured to make the data transfer between the nodes via any other internodal crossbar switch than the internodal crossbar switch having the switch where the fault occurs.

16 Claims, 9 Drawing Sheets

PROCESSING RCU IS DECIDED ACCORDING TO THE EIGHTH BIT EXCEPT FOR 7BITS IN THE 128B BOUNDARY
(CASE OF TWO RCUS)
0:RCU #0
1:RCU #1
IN THE CASE OF ONE RCU, RCU #0 OR #1 CONSTITUTED IS SET WITHOUT REGARD TO THIS BIT

MULTI-NODE SYSTEM, INTERNODAL CROSSBAR SWITCH, NODE AND MEDIUM EMBODYING PROGRAM

BACKGROUND OF THE INVENTION

1. Field of the Invention

The present invention relates to a multi-node system, an internodal crossbar switch, a node and a medium embodying program, and more particularly to a multi-node system, an internodal crossbar switch, a node and a medium embodying program in which it is possible to prevent a system down even if a fault occurs in one crossbar switch.

2. Description of the Related Art

To cope with the yearly increasing demands for improving the calculation performance in the field of the science and technology calculation, the performance improvement as the entire system is achieved by connecting two or more high performance nodes composed of two or more CPUs and shared memory. In this case, though the connection between nodes is made via an internodal controller installed in each node and transferring data and an internodal crossbar switch for transferring data between nodes, there was a problem that the node broke down, if a fault occurred in the internodal controller or the crossbar switch.

A technology as disclosed in Japanese Patent Laid-Open No. 2001-256203 involves a system in which the crossbar switch connects between nodes. This system installs the N+1 crossbar switches, including one redundant switch, between the N nodes. If a fault processing circuit of this system recognizes the fault of the crossbar switch when a system failure occurs, this fault processing circuit controls a selection circuit provided in the input/output part of the crossbar switch, and stops the use of the crossbar switch where the fault occurs.

After the re-start-up system, the operation that evades the crossbar switch with the fault can be done according to the above-mentioned technology, when the fault occurs in the crossbar switch that connects between nodes by assuming the crossbar switch to be a redundant configuration. When the fault does not occur, the redundant crossbar switch is not used.

Moreover, the technology as disclosed in Japanese Patent Laid-Open No. 2003-46526, a plurality of internodal controllers are provided in connected part between <internodal crossbar switch for the data transfer between nodes> and each node, varying the forwarding performance between nodes according to the performance of the processor within the node.

According to the above-mentioned technology, the forwarding performance between nodes is varied, and even if one internodal controller breaks down, another internodal controller can continuously drive the system.

SUMMARY OF THE INVENTION

The present invention provides a multi-node system for making the data transfer between nodes via an internodal crossbar switch, the system including a plurality of nodes and a plurality of internodal crossbar switches having a switch for transmitting the transfer data from the node to the node of transfer destination, wherein if a fault occurs in the switch, the system is configured to make the data transfer between the nodes via any other internodal crossbar switch than the internodal crossbar switch having the switch where the fault occurs.

Also, the invention provides an internodal crossbar switch comprising a switch connected to a plurality of nodes and transmitting the transfer data from the nodes to the node of transfer destination, a diagnosis device for performing a fault processing, and a status communication control unit for communicating the status information with the nodes, wherein if the diagnosis device detects a fault occurring in the switch, the status communication control unit is instructed to notify the information that the internodal crossbar switch having the switch where the fault occurs is at fault to the plurality of nodes, whereby the information that the internodal crossbar switch is at fault is notified from the status communication control unit to the plurality of nodes.

Also, the invention provides a node comprising an internodal controller connected to a plurality of internodal crossbar switches having a switch for transferring the data to a transfer destination and initiating the data transfer upon receiving a data transfer instruction, a status communication control unit for communicating the status information with the internodal crossbar switch, a plurality of data processing units, and a diagnosis device, wherein upon receiving the information of a fault state from the internodal crossbar switch, the status communication control unit notifies the fault state to the diagnosis device, and the diagnosis device stops a transfer instruction from the software operating in the data processing unit.

Also, the invention provides a signal bearing medium tangibly embodying a switch program of machine-readable instructions executable by digital processing apparatus, the program being executed on an internodal crossbar switch including a switch connected to a plurality of nodes and transmitting the transfer data from the nodes to the node of transfer destination, a diagnosis device for performing a fault processing, and a status communication control unit for communicating the status information with the nodes, wherein if the diagnosis device detects a fault occurring in the switch, the diagnosis device instructs the status communication control unit to "notify the plurality of the nodes" that "the internodal crossbar switch having the switch is at fault", and the status communication control unit to notify the information to the plurality of nodes.

Since this invention allows the multiplexed crossbar switch to be employed from each node, it is possible to prevent a system down, if a fault occurs in one crossbar switch.

In this invention, the multiplexed crossbar switch effective to prevent a system down may be also employed to enhance the system performance in the normal use.

Also, since the data transfer path capable of high speed communication is employed for the status communication between the node and the crossbar switch, it is possible to transmit or receive the status at high speed.

BRIEF DESCRIPTION OF THE DRAWINGS

The above and other exemplary, features and advantages of the present invention will become apparent from the following detailed description when taken with the accompanying drawings, in which.

DETAILED DESCRIPTION OF THE PREFERRED EMBODIMENTS

A first embodiment of the present invention will be described below in detail with reference to the drawings.

Figure 1:
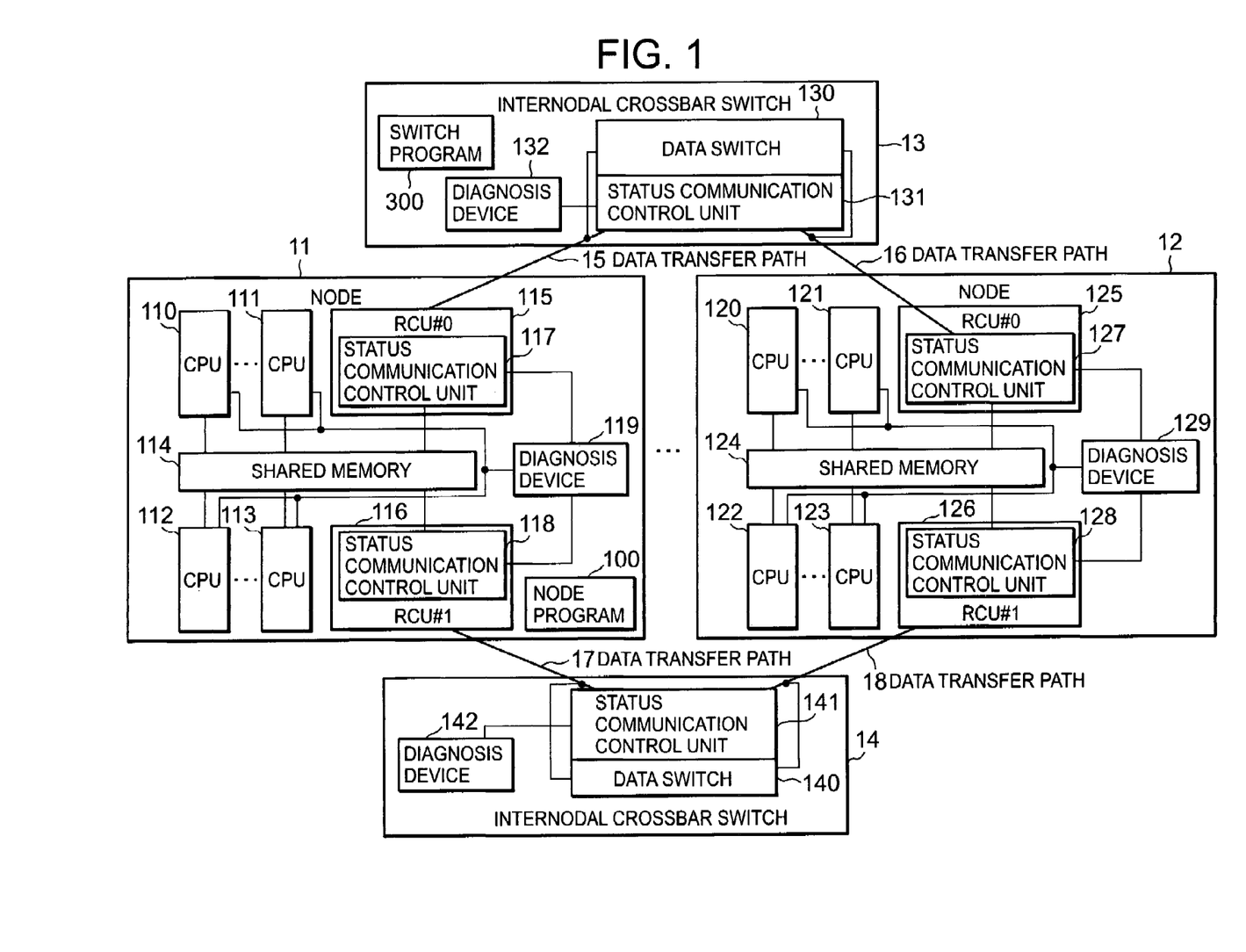
FIG. 1 is a block diagram showing the configuration of a multi-node system according to the present invention.

Referring to FIG. 1, a multi-node system of the first embodiment comprises two nodes 11, 12, and two internodal crossbar switches 13, 14. Though two nodes are shown in FIG. 1, three or more nodes may be similarly dealt with.

The nodes 11, 12 are connected to each other via the internodal crossbar switches 13, 14.

A node 11 is connected to the internodal crossbar switches 13, 14 via the data transfer paths 15, 17.

Also, a node 12 is connected to the internodal crossbar switches 13, 14 via the data transfer paths 16, 18.

The node 11 comprises the data processing units CPU 110, CPU 111, CPU 112 and CPU 113, the internodal controllers RCU 115 (RCU#0) and RCU 116 (RCU#1), a shared memory 114 that is shared among all the CPUs 110 to 113 and RCUs 115 and 116 within the node, and a diagnosis device 119 for performing the fault processing and configuration control within the node. Though four CPUs within the node are shown in FIG. 1, the number of CPUs may be larger or smaller.

Also, the node 12, like the node 11, comprises the data processing units CPU 120, CPU 121, CPU 122 and CPU 123, the internodal controllers RCU 125 (RCU#0) and RCU 126 (RCU#1), a shared memory 124 that is shared among all the CPUs 120 to 123 and RCUs 125 and 126 within the node, and a diagnosis device 129 for performing the fault processing and configuration control within the node.

The RCUs 115, 116 within the node 11 are connected to the internodal crossbar switches 13, 14, respectively. The RCUs 125, 126 within the node 12 are connected to the internodal crossbar switches 13, 14, respectively.

An internodal crossbar switch 13 comprises a data switch 130 for sending the transfer data from the node to the node of transfer destination, a diagnosis device 132 for performing the fault processing and configuration control within the internodal crossbar switch 13, and a status communication control unit 131, connected to the diagnosis device 132, for making the status (state) communication with the nodes 11, 12. An internodal crossbar switch 14 has the same configuration as the internodal crossbar switch 13.

The data transfer between the nodes is initiated by notifying a data transfer instruction between the nodes from the CPU to the RCU within the node where the CPU is placed, as described below.

Figure 2:
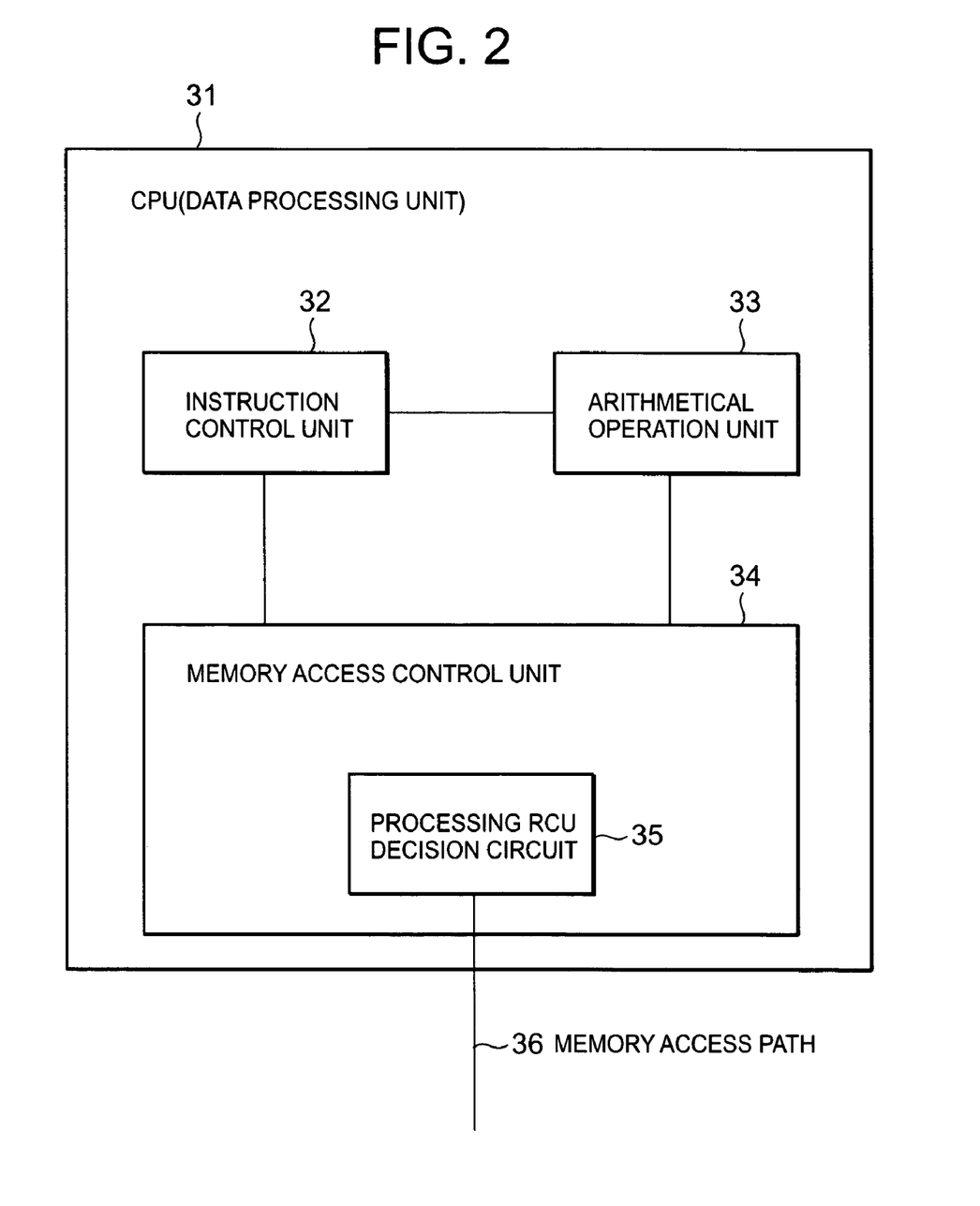
FIG. 2 is a block diagram showing the configuration of a CPU according to the invention.

For example, when the data in the shared memory 114 of the node 11 is transferred to the shared memory 124 of the node 12, a data transfer instruction between the nodes (denoted as an internodal data transfer instruction) is firstly notified from the CPU 110 to RCU 115. The internodal data transfer instruction (transfer request) is set by a user program, and issued from an instruction control unit 32 of the CPU as shown in FIG. 2.

The RCU 115 that has received the transfer instruction from the CPU 110 reads the data to be transferred from the shared memory 114, and transfers it to the internodal crossbar switch 13.

The data switch 130 of the internodal crossbar switch 13 transfers the data to the node 12, based on a transfer destination port number of the sent data.

The transfer data sent from the internodal crossbar switch 13 is received by the RCU 125 of the node 12, and written into the shared memory 124. The data transfer between the nodes is performed in the above way.

FIG. 2 is a block diagram showing the configuration of the CPU 31. The CPU 31 has the same configuration as the CPUs 110, 111, 112, 113, 120, 121, 122 and 123 as shown in FIG. 1.

Referring to FIG. 2, the CPU 31 comprises an instruction control unit 32, an arithmetical operation unit 33, a memory access control unit 34, and a processing RCU decision circuit 35. The memory access control unit 34 comprises the processing RCU decision circuit 35.

The instruction control unit 32 reads an instruction processed by the CPU 31 from the shared memory 114 (or shared memory 124), and instructs the arithmetical operation unit 33 or the memory access control unit 34 to perform the operation in accordance with the contents of the instruction.

The arithmetical operation unit 33 performs the arithmetical operation by reading the contents of an internal register (not shown) in accordance with an instruction from the instruction control unit 32, and writes the result into the internal register.

Also, the memory access control unit 34 writes the arithmetical operation result made by the arithmetical operation unit 33 into the shared memory 114 (or shared memory 124), or reads the operation data from the shared memory 114 (or shared memory 124) in accordance with an instruction from the instruction control unit 32.

The processing RCU decision circuit 35 decides the RCU that processes the internodal data transfer instruction among a plurality of RCUs.

A memory access path 36 is also used as a request path to the RCUs 115, 116 (or RCUs 125, 125), in addition to a path for gaining access to the shared memory 114 (or shared memory 124).

The instruction control unit 32, upon detecting an internodal data transfer instruction, notifies the contents of the instruction to the memory access control unit 34. The memory access control unit 34 converts the notified contents into the memory access format.

Figure 3:
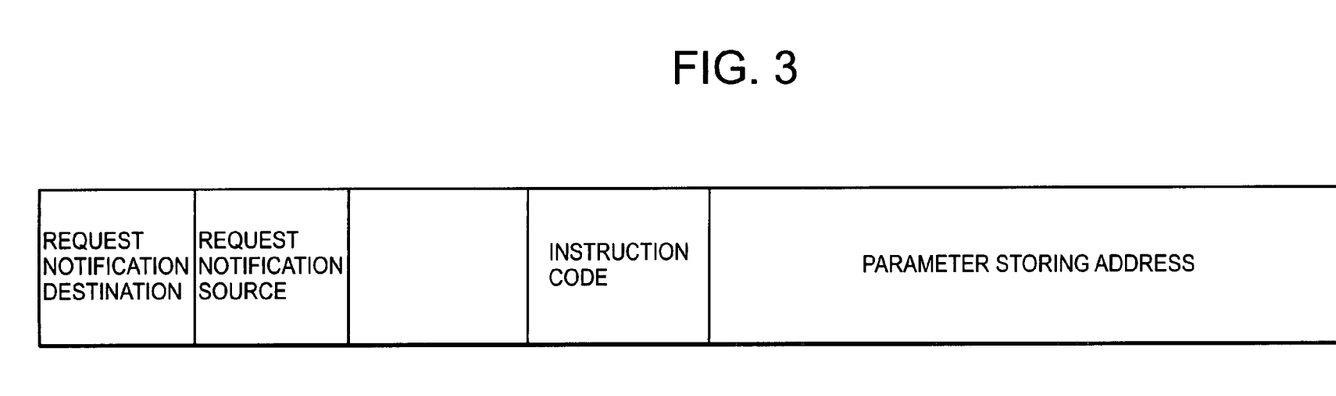
FIG. 3 is an explanatory diagram showing one example of an internodal data transfer instruction according to the invention.

FIG. 3 is an explanatory diagram showing one example of an internodal data transfer instruction converted into the memory access format.

In the format conversion, the processing RCU decision circuit 35 decides the RCU that processes the internodal data transfer instruction, and attaches the RCU number (e.g., the RCU numbers of the RCU 115, RCU 116, RCU 125, RCU 126 are 0, 1, 0 and 1) in a field indicating the notification destination in the memory access format as shown in FIG. 3.

In this way, the internodal data transfer instruction converted in the format is sent via the memory access path 36 to the shared memory 114 (or shared memory 124). The shared memory 114 (or shared memory 124) notifies the internodal data transfer instruction converted in the format to the RCU specified in the contents of the notification destination field.

In this way, the internodal data transfer instruction from the CPU is passed to the shared memory 114 (or shared memory 124), and then transmitted from the shared memory 114 (or shared memory 124) to the RCU.

Figure 4:
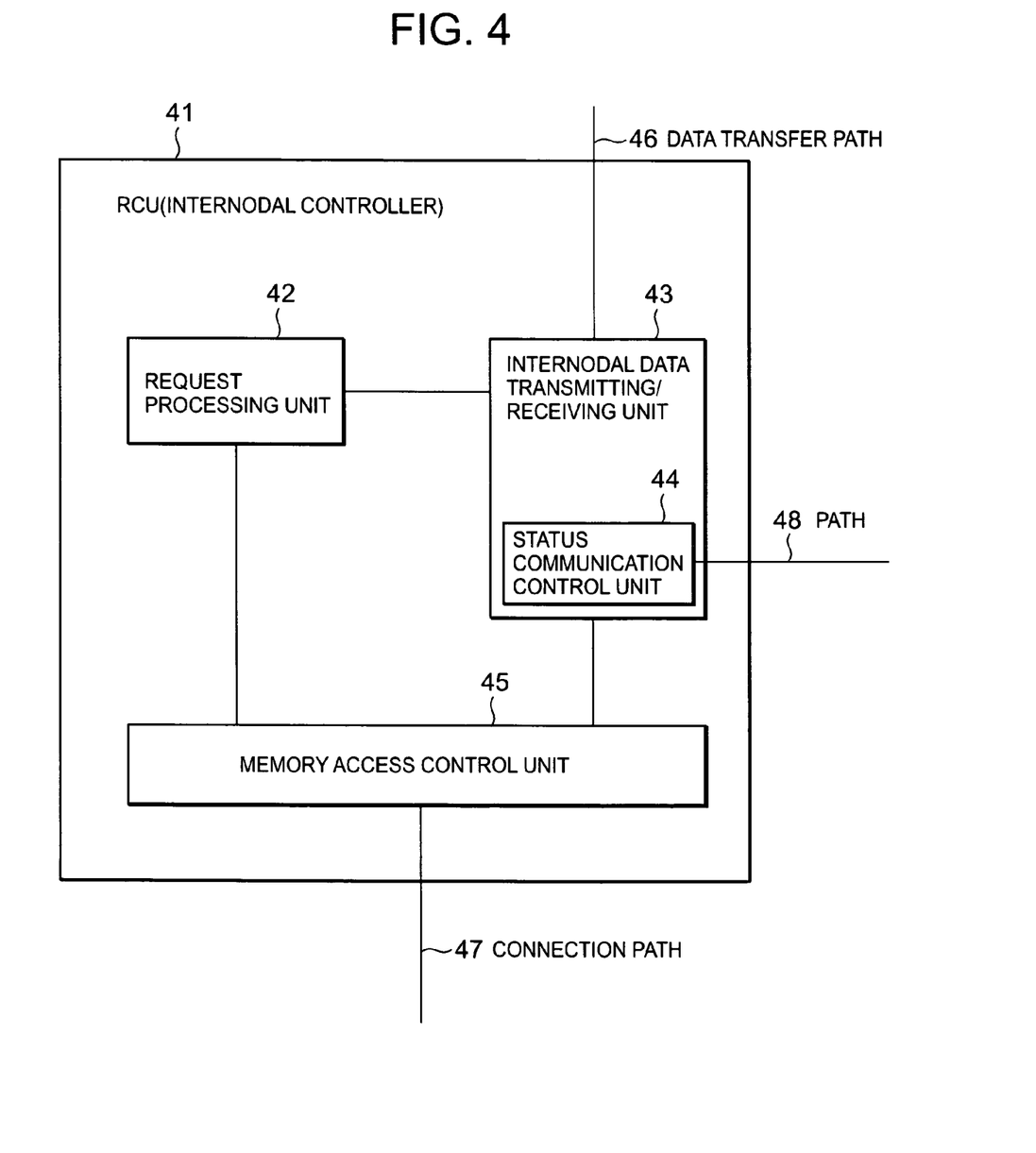
FIG. 4 is a block diagram showing the configuration of an RCU according to the invention.

FIG. 4 is a block diagram showing the configuration of an RCU 41. The RCU 41 has the same configuration as the RCUs 115, 116, 125 and 126 as shown in FIG. 1.

Referring to FIG. 4, a memory access control unit 45 connected via a connection path 47 to the shared memory 114 (or shared memory 124) receives a request (in the format as shown in FIG. 3) sent from the CPU to the RCU. A request processing unit 42 receives this request from the memory access control unit 45, and instructs an internodal data transmitting/receiving unit 43 or the memory access control unit 34 to perform the operation.

The internodal data transmitting/receiving unit 43 is connected via a data transfer path 46 to the internodal crossbar switch, and transmits or receives the data or control information to or from another node.

The memory access control unit 45 is connected via a connection path 47 to the shared memory 114 (or shared memory 124) within the node, and transmits or receives the data or control information to or from the shared memory in accordance with an instruction of the request processing unit 42.

A status communication control unit 44 detects the status information from the internodal crossbar switch 13 (or internodal crossbar switch 14) that is passed via the data transfer path 46 and notifies the status information to the diagnosis device 119 (or diagnosis device 129) via a path 48. Also, the status communication control unit 44 notifies the status information via the data transfer path 46, upon an instruction from the diagnosis device 119 (or diagnosis device 129).

Also, the RCU 41 as shown in FIG. 4 reads the data from the shared memory 114 (or shared memory 124) within the node in accordance with an internodal data transfer instruction sent from another node. Then, the RCU 41 transfers the read data to a requesting node, or writes the transfer data sent from the requesting node into the shared memory 114 (or shared memory 124) within the node.

In performing the internodal data transfer, prior to data transmission, the control information for data transfer is transmitted via the data transfer path 46 to the internodal data transmitting/receiving unit 43. The transmitted control information is sent to the request processing unit 42. The request processing unit 42 issues an instruction conforming to the control information to the memory access control unit 45 and the internodal data transmitting/receiving unit 43.

The memory access control unit 45 passes data with the shared memory 114 (or shared memory 124) in accordance with an instruction from the request processing unit 42. Also, the internodal data transmitting/receiving unit 43 transmits or receives a control signal or data to or from another node in accordance with an instruction from the request processing unit 42.

Figure 5:
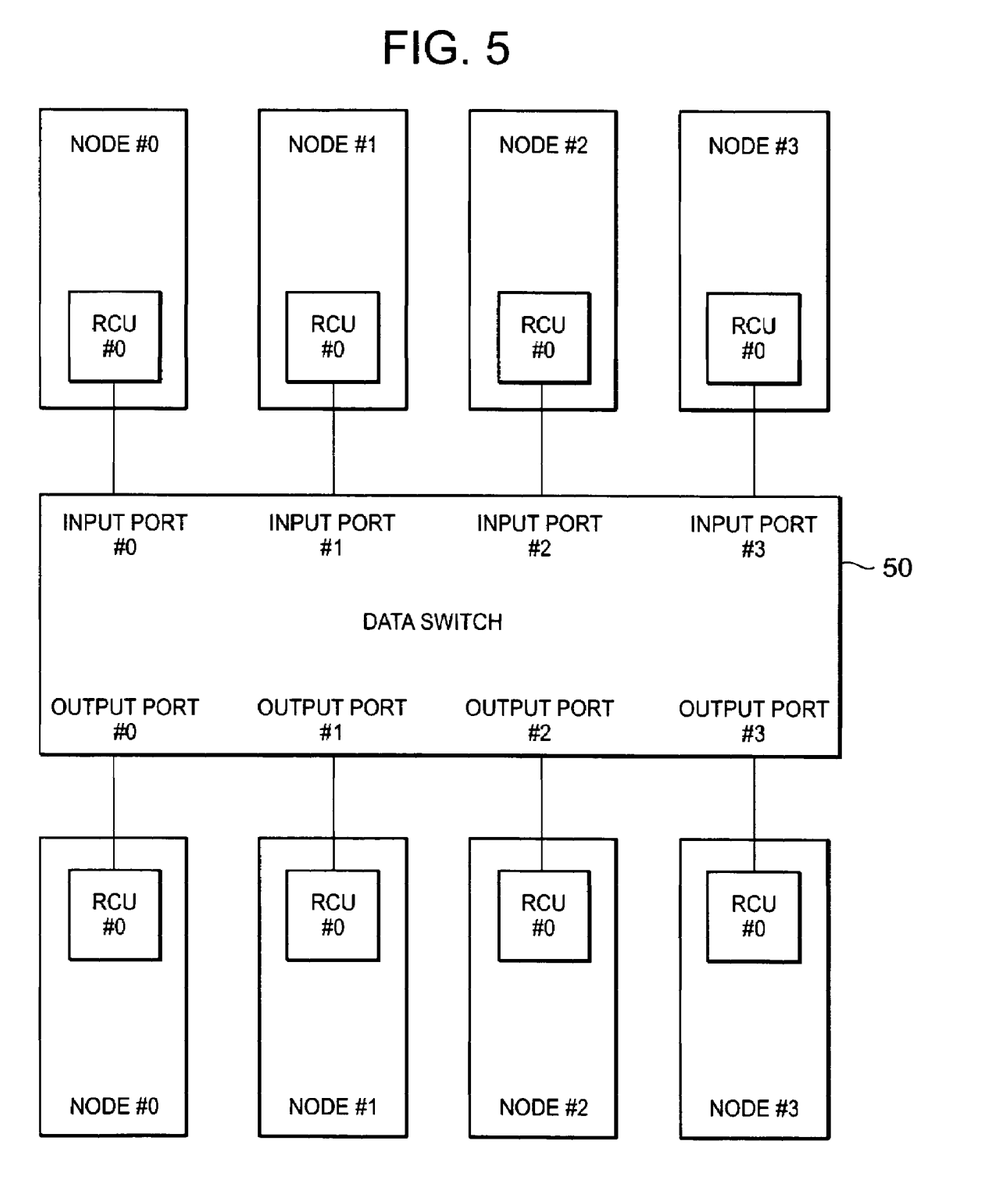
FIG. 5 is a block diagram showing the configuration of a data switch according to the invention.

FIG. 5 is a block diagram showing the connection of the data switch 50 with the nodes. The data switches 130, 140 as shown in FIG. 1 have the same configuration as the data switch 50.

Referring to FIG. 5, the data switch 50 is a 4×4 crossbar switch composed of four input ports and four output ports.

The input ports #0, #1, #2 and #3 of the data switch 50 are connected to the RCU#0 of the nodes #0, #1, #2 and #3, respectively. Also, the output ports #0, #1, #2 and #3 of the data switch 50 are connected to the RCU#0 of the nodes #0, #1, #2 and #3, respectively.

The data switch 50 can perform the data transfer from four input ports to four output ports at the same time.

The data transfer is made by designating the transfer destination port number sent from the RCU connected to the input port. For example, if the transfer destination port number is 0, the data is transferred to the output port #0 of the data switch, viz., the RCU#0 of the node#0.

Also, if the transfer destination port number is 1, the data is transferred to the output port #1, viz., the RCU#0 of the node#1. In this way, the value indicated by the transfer destination port number is the number of the output port.

The data switch 50 can pass the control information or data from all the input ports to all the output ports at the same time.

The operation of the first embodiment will be described below in detail with reference to the drawings.

In the data transfer, first of all, the user program secures an internodal transfer queue (waiting line) on the shared memory, and writes the transfer parameters required for the transfer into the secured queue. Thereafter, the user program issues an internodal data transfer instruction indicating the parameter position from each CPU.

In the user program, only one RCU is assumed. This means that more than one RCU looks like one RCU from the user program.

In securing the internodal transfer queue, the user program on a plurality of CPUs sequentially stacks the transfer parameters into one queue on the shared memory. This is intended to make the user program unaware of the hardware configuration.

Figure 6:
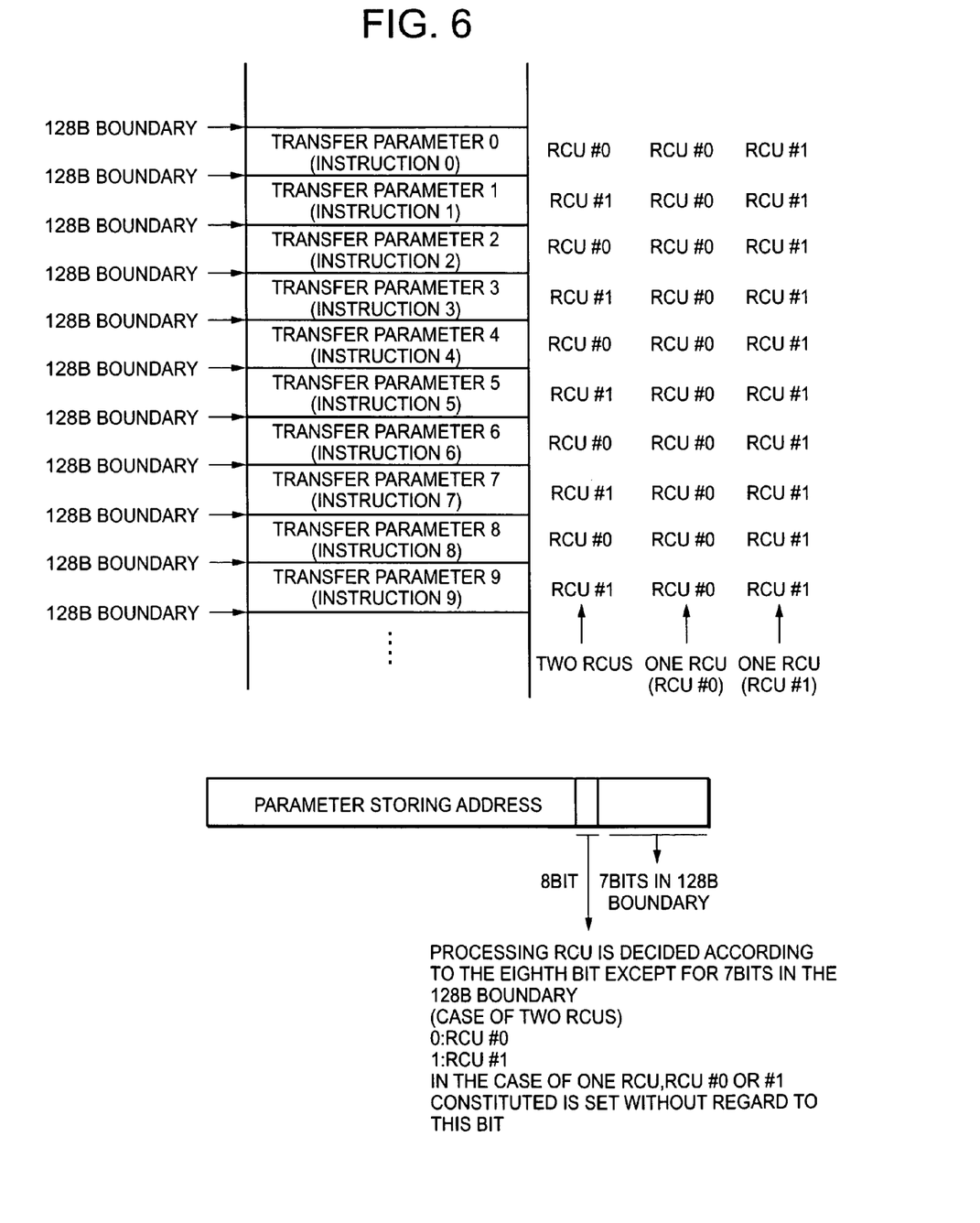
FIG. 6 is an explanatory diagram showing one example of an internodal transfer queue.

FIG. 6 is an explanatory view showing one example of deciding the RCU for processing the internodal transfer queue and instruction.

Referring to FIG. 6, the transfer parameters required for the internodal data transfer instruction are written in an area (of every 128 bytes) of the shared memory secured by the user program.

Each internodal transfer instruction includes an address at 128-byte boundary as a parameter storing address. The RCU reads the transfer parameters from the parameter storing address, and performs the internodal data transfer in accordance with the read contents.

Figure 7:
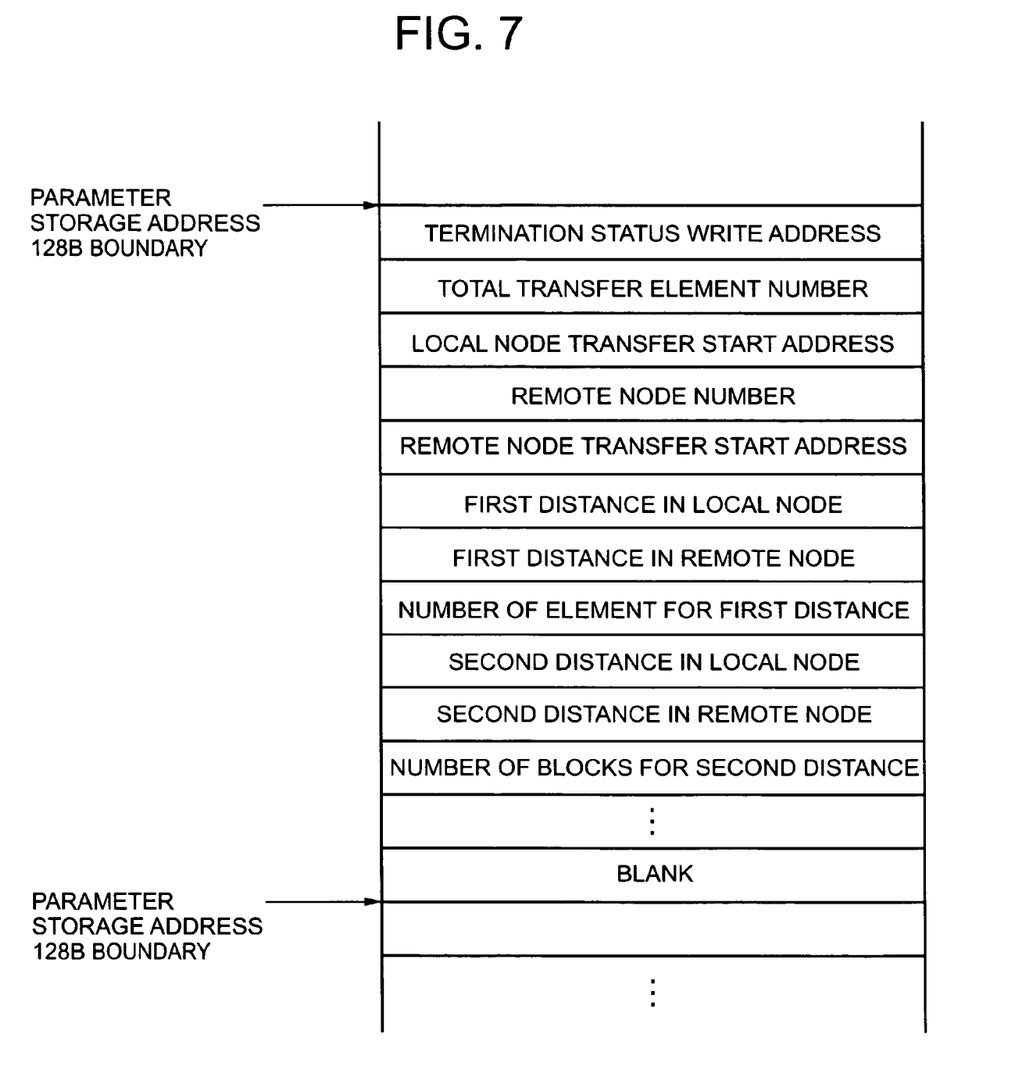
FIG. 7 is an explanatory diagram exemplifying the internodal transfer parameters.

FIG. 7 is an explanatory diagram showing one example of the internodal transfer parameters written on the shared memory by the user program.

The internodal transfer parameters as shown in FIG. 7 are the parameter example of two distance (distance between elements) transfer to collectively transfer a part of multidimensional array data by internodal data transfer.

A termination status write address indicates the address of writing the status of normal termination or exception as a result of transfer into the shared memory. The total transfer element number is the number of elements in the total transfer amount where one element is 8-byte data.

A local node transfer start address is the address indicating the start position of data transfer in the shared memory within a node where the CPU issuing the instruction exists (hereinafter referred to as a local node).

A remote node number is the number of a node that is a partner of the local node in the internodal transfer (hereinafter referred to as a remote node). A remote node transfer start address is the address indicating the start position of data transfer in the shared memory within the remote node.

An internodal data transfer instruction has a read transfer instruction of reading the data from the shared memory of the remote node, transferring the read data from the remote node to the local node and writing the data into the shared memory of the local node, and a write transfer instruction of reading the data from the shared memory of the local node, transferring the read data from the local node to the remote node and writing the data into the shared memory of the remote memory.

In the following, the operation of the write transfer instruction of transferring the data from the local node to the remote node will be described below in detail.

At first, the notification of the internodal data transfer instruction from the CPU to the local node, the data transfer in the local node, and the data acquisition in the local node will be described.

The main portions of FIGS. 2 to 4 are referred to, as necessary. In the following, since two nodes of the local node and the remote node are dealt with, the CPU or the RCU of FIGS. 2 and 4 are not attached with signs to make the explanation.

An internodal data transfer instruction set by the user program is issued from the instruction control unit 32 of the CPU.

The internodal data transfer instruction includes the information such as a transfer type indicating the write transfer, and a parameter storing address. The instruction control unit 32 notifies the information to the memory access control unit 34. The memory access control unit 34 converts the transfer instruction into the memory access format, and transmits the internodal data transfer instruction via the memory access path 36 to the RCU.

In FIG. 3, one example of the internodal data transfer instruction converted into the memory access format by the memory access control unit 34 is shown.

The memory access format includes a request notification destination, a request notification source, an instruction code and a parameter storing address.

The instruction code includes the information indicating the write transfer. Also, the parameter storing address includes the information regarding the transfer parameters.

The request notification destination includes the number of the CPU issuing the transfer instruction.

In the case of the internodal data transfer instruction, the number of the RCU performing the transfer is included in the request notification destination. Also, the parameter storing address information includes the parameter storing address indicating the storage position of the internodal transfer parameters (see FIG. 7) on the shared memory.

The processing RCU decision circuit 35 decides the processing RCU, based on the parameter storing address, as shown in FIG. 6, generates the request notification destination, sets the internodal data transfer instruction and issues it to the shared memory.

As shown in FIG. 6, the transfer parameters are sequentially written into the queue, but the processing RCU for making the transfer is decided from the memory address at which the transfer parameter is written.

Referring to FIG. 6, the processing RCU is assigned by the parameter storing address in such a way that the instruction 0 regarding the transfer parameter 0 is processed by the RCU #0, the instruction 1 regarding the transfer parameter 1 is processed by the RCU #1, and the instruction 2 regarding the transfer parameter 2 is processed by the RCU #0.

As shown in FIG. 6, in the case where two RCUs are provided, the eighth bit except for 7 bits at the 128-byte boundary of the parameter storing address is the information of deciding the processing RCU for processing the transfer instruction.

The processing RCU decision circuit 35 notifies an internodal data transfer instruction including the request notification destination information to the shared memory. The shared memory receiving the notification transmits the internodal data transfer instruction to the RCU in accordance with the request notification destination.

In the above, the notification of the internodal data transfer instruction to the local node is ended.

Next, the data transfer in the local node will be described below.

First of all, the memory access control unit 45 of the RCU within the local node receives the internodal data transfer instruction from the shared memory via the connection path 47 (see FIG. 4).

Next, the memory access control unit 45 transfers the internodal data transfer instruction to the request processing unit 42.

The request processing unit 42 receiving the transfer instruction confirms the write transfer from the instruction code included in the format as shown in FIG. 3. Next, the request processing unit 42 instructs the memory access control unit 45 to read the transfer parameters from the position (in the shared memory) indicated by the parameter storing address.

The memory access control unit 45 reads the transfer parameters of 128 bytes from the transfer parameter storing address of the shared memory, and transfers them to the request processing unit 42.

The request processing unit 42 extracts the local node transfer start address, total transfer element number, first distance in local node, and second distance in local node from the internodal transfer parameters as shown in FIG. 7.

Also, the request processing unit 42 instructs the memory access control unit 45 to read the data for write transfer from the shared memory of the local node into the RCU, based on the extracted contents.

The memory access control unit 45 reads the transfer data from the shared memory, and transfers it to the internodal data transmitting/receiving unit 43.

The internodal data transmitting/receiving unit 43 stores the transfer data from the shared memory read by the memory access control unit 45 in every predetermined unit into a buffer, and notifies the request processing unit 42 if the predetermined unit is stored.

If notified that the transfer data of the predetermined unit is accumulated in the buffer, the request processing unit 42 sends the remote node number, remote node transfer start address, first distance on remote note, and second distance in remote node, which are written in the internodal transfer parameters, to the internodal data transmitting/receiving unit 43, and then instructs the internodal data transmitting/receiving unit 43 to start the data transfer.

The internodal data transmitting/receiving unit 43 receiving an instruction of starting the data transfer transmits the remote node number, remote node transfer start address, first distance in remote note, and second distance in remote node as the control information to the remote node, before transmitting the transfer data.

In making the transfer, in the local node, the RCU generates the routing information (port number) of the internodal crossbar switch to transfer the data to the remote node.

In the above, the data transfer in the local node is ended.

The data acquisition in the remote node will be described below.

The port number generated in the local node is sent to the internodal crossbar switch. Further, the internodal data transmitting/receiving unit 43 in the local node transmits the remote node number, remote node transfer start address, first distance in remote node, and second distance in remote node as the control information to the internodal crossbar switch. Further, the internodal data transmitting/receiving unit 43 sequentially transmits the transfer data in the predetermined unit stored in the buffer.

The internodal crossbar switch changes the switch of crossbar according to the port number to pass the control information or data to the desired port, and transfers the control information or transfer data to the remote node.

The internodal data transmitting/receiving unit 43 within the RCU of the remote node receives the transmitted control information or transfer data. The internodal data transmitting/receiving unit 43 sends the control information to the request processing unit 42. The internodal data transmitting/receiving unit 43 stores the transfer data in the internal buffer.

The request processing unit 42 acquiring the control information generates a shared memory address of storing the transfer data within the remote node from the contents of the control information, and transfers it to the memory access control unit 45. Also, the request processing unit 42 transfers an instruction of reading the transfer data from the internal buffer to the internodal data transmitting/receiving unit 43. The internodal data transmitting/receiving unit 43 reads the transfer data from the internal buffer in accordance with the instruction of reading the transfer data and transfers it to the memory access control unit 45.

The memory access control unit 45 acquires the shared memory address from the request processing unit 42 and the transfer data from the internodal data transmitting/receiving unit 43, and issues a memory write request to the shared memory.

The write transfer for internodal transfer is performed in the above way.

On the other hand, in the read transfer for internodal transfer, a data read instruction is conveyed from the local node to the remote node. Then, in the remote node, the data is read from the shared memory, and the read data is transmitted via the internodal crossbar switch to the local node. Then, the local node writes the transmitted data into the shared memory within the local node.

The operation if a fault occurs in the internodal crossbar switch will be described below.

Figure 8:
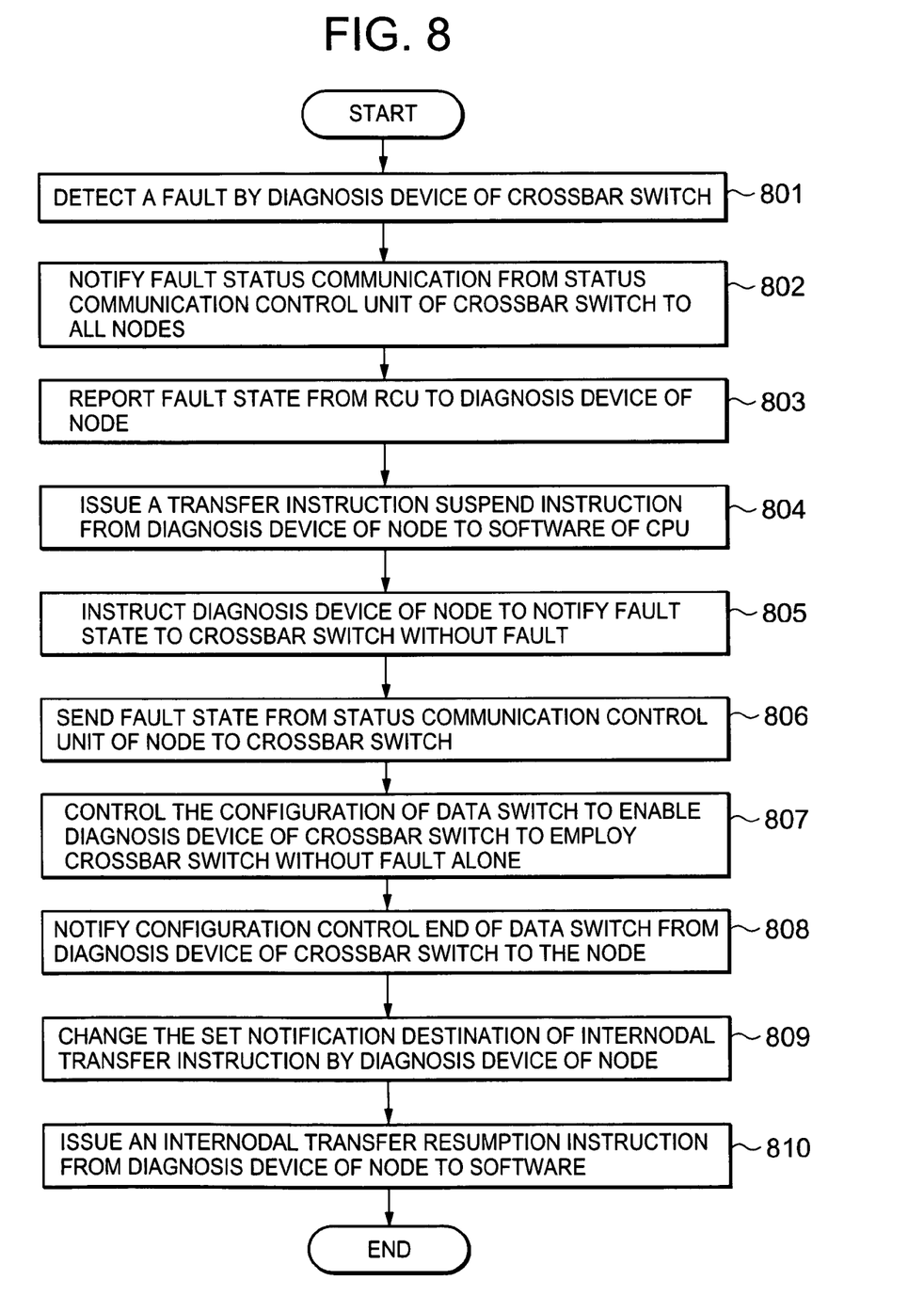
FIG. 8 is a flowchart showing an operation if a fault occurs.

FIG. 8 is a flowchart for explaining the operation if a fault occurs.

Referring to FIG. 8, if a fault occurs in the data switch 130 of the internodal crossbar switch 13, a fault report is notified to the diagnosis device 132. The diagnosis device 132 detects that the internodal crossbar switch 13 is at fault from the notified contents of fault (step 801 in FIG. 8).

The diagnosis device 132 instructs the status communication control unit 131 to communicate a status that the internodal crossbar switch 13 is at fault to all the nodes.

The status communication control unit 131 receiving the instruction communicate the status that the internodal crossbar switch 13 is at fault, employing the data transfer paths 15, 16 (step 802). Since this status communication is performed employing the data transfer paths 15, 16 capable of high speed communication, the status is rapidly notified to all the notes.

The status communication control units 117, 127 within the RCU 115, 125 provided in the nodes 11, 12 decodes the communication contents received by the status communication, and reports the fault state of the internodal crossbar switch 13 to the diagnosis devices 119, 129 provided in the nodes 11, 12 (step 803).

The diagnosis devices 119, 129 receiving the report instructs the software operating in the CPUs of all the nodes to suspend the transfer instruction to switch the system configuration (step 804).

Also, the diagnosis devices 119, 129 instruct the status communication control units 118, 128 within the RCU 116, 126 connected to the internodal crossbar switch 14 to notify the status that the internodal crossbar switch 13 is at fault to the internodal crossbar switch 14 (step 805).

Based on this instruction, the status communication control units 118, 128 perform the status communication to the internodal crossbar switch 14 via the data transfer paths 17, 18 (step 806).

Receiving the information that the internodal crossbar switch 13 is at fault, the status communication control unit 141 of the internodal crossbar switch 14 reports to the diagnosis device 142 that the internodal crossbar switch 13 is at fault.

The diagnosis device 142 receiving the report makes the configuration control for the data switch 140 to operate the internodal crossbar switch 14 alone (step 807).

After the end of the configuration control, the diagnosis device 142 notifies the status communication of configuration control end via the status communication control unit 141 to the nodes 11, 12 (step 808).

The status communication control units 118, 128 of the nodes 11, 12 receiving the status communication of configuration control end report to the diagnosis devices 119, 129 the information of configuration control end.

Upon receiving the information of configuration control end for the data switch 140, the diagnosis devices 119, 129 perform the configuration control for making the internodal crossbar switch 14 alone usable among the internodal crossbar switches for each device within the node.

In the configuration control performed by the diagnosis devices 119, 129, the configuration information is changed so that the processing RCU decision circuit 35 (see FIG. 2) of the CPUs 110, 113, 120 and 123 decides the RCUs 116 and 126 as the notification destination of the internodal transfer request (step 809).

The processing RCU decision circuit 35 decides the processing RCU, based on the configuration information alone of the RCUs 116 and 126 with the changed configuration.

If the change of configuration information for the device within the node is ended, the diagnosis devices 119, 129 instruct the software of the nodes 11, 12 to resume the internodal data transfer instruction. Then, the software starts to issue the internodal data transfer instruction again (step 810).

In the operation as described above, if a fault occurs in the internodal crossbar switches 13, 14, the system configuration can be dynamically changed, whereby the system is relieved of a situation where the fault of the internodal crossbar switches 13, 14 leads to a system down.

That is, even if a fault occurs in one crossbar switch, the system down is prevented.

A second embodiment of the invention will be described below.

Figure 9:
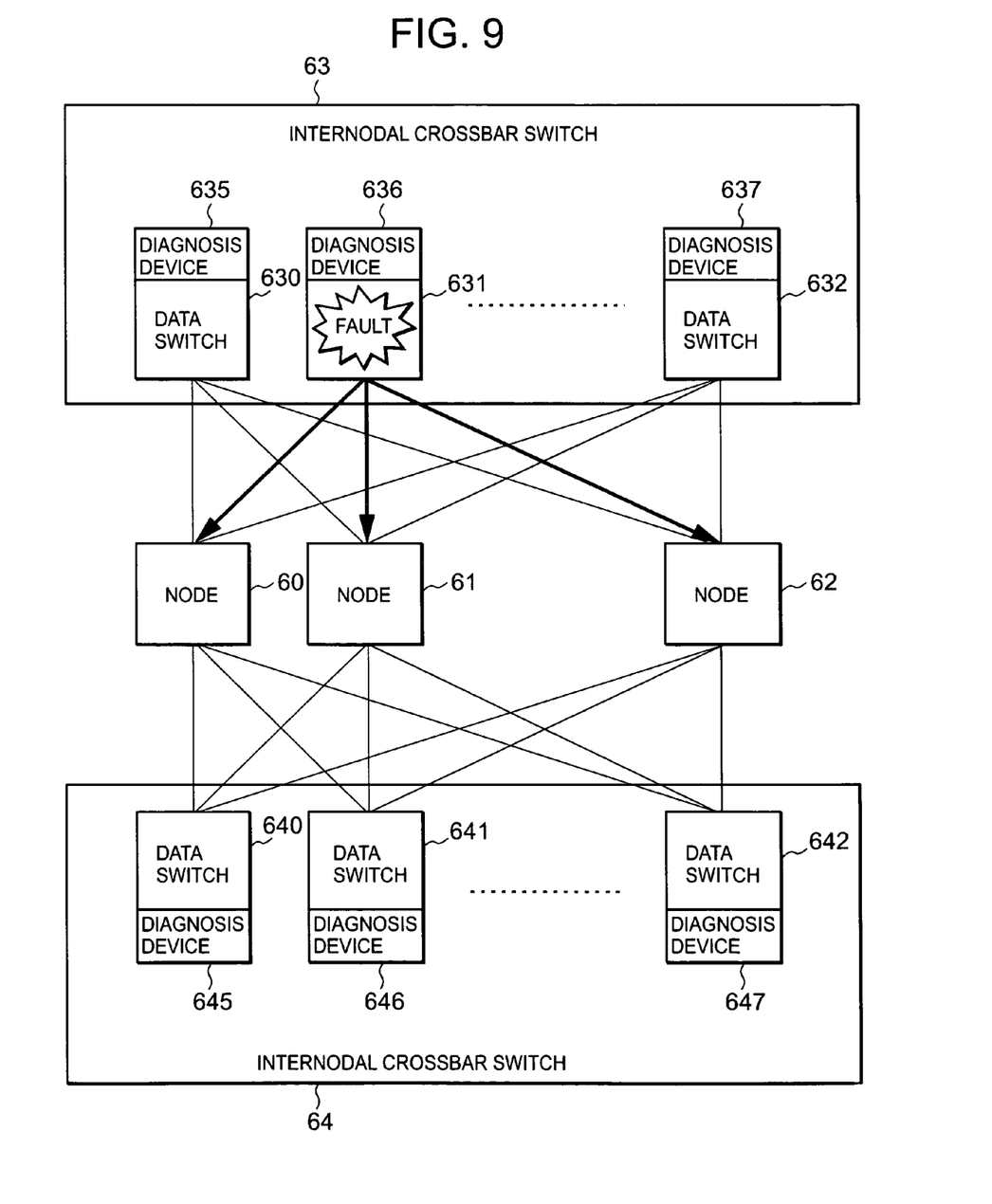
FIG. 9 is a block diagram showing the configuration of a multi-node system according to a second embodiment of the invention.

FIG. 9 is a block diagram showing the configuration of a multi-node system according to the second embodiment.

Referring to FIG. 9, the second embodiment corresponds to a larger scale system than the first embodiment.

An internodal crossbar switch 63 comprises the data switches 630, 631, . . . , 632, and the diagnosis devices 635, 636, . . . , 637. An internodal crossbar switch 64 comprises the data switches 640, 641, . . . , 642, and the diagnosis devices 645, 646, . . . , 647.

Even if the switch deals with a great number of nodes, the high speed data transfer is enabled by suppressing the data transfer latency (time required for data transfer).

In this case, the data switch is also composed of a plurality of devices, it is required that the status is consistent between the data switches to perform the unified operation as the system.

The operation if a fault occurs in a data switch 631 within the internodal crossbar switch 63 will be described below.

If a fault occurs in the data switch 631, a diagnosis device 636 performs the status communication for fault notification via the status communication control unit (not shown) to all the nodes 60, 61, . . . , 62. This fault notification is reported via the status communication control unit of each node to the diagnosis device (not shown) within each node.

The diagnosis device within each node issues an instruction of stopping the transfer instruction to the software of the CPU within each node, based on the received status communication. Also, the diagnosis device transmits the fault notification of the internodal crossbar switch 63 via the RCU to all the data switches 640, 641, . . . , 642 of the crossbar switch 64.

Moreover, the fault notification from the diagnosis device 636 is transmitted to the data switches 630, . . . , 632 other than the data switch 631 where the fault of the internodal crossbar switch 63 occurs.

Through the above operation, each data switch can grasp the status of the internodal crossbar switch to which it belongs, and perform the operation based on the status.

The diagnosis device 635, 636, . . . , 637 of the data switches 630, 631, . . . , 632 within the internodal crossbar switch 63 change the configuration information, based on the status that the internodal crossbar switch 63 is at fault, reset a beginning state (halfway progress state) remaining within the internodal crossbar switch 63, and make the preparation for reincorporating the data switch 631 which is recovered.

On the other hand, the data switches 640, 641, . . . , 642 of the internodal crossbar switch 64 also change the configuration information to reset the beginning state and enable the transfer with the internodal crossbar switch 64 alone, and issue a configuration change completion notice to the nodes 60, 61, . . . , 62 if a configuration change process is completed.

The nodes 60, 61, . . . , 62 receiving the configuration change completion notice from all the data switches 640, 641, . . . , 642 of the internodal crossbar switch 64, change the configuration information within the node to enable the internodal data transfer with the internodal crossbar switch 64 alone and issues an internodal transfer resumption instruction to the software. Then, the nodes 60, 61, . . . , 62 restarts the multi-node operation employing the internodal crossbar switch 64 alone.

As described above, the second embodiment is a large scale multi-node system in which the internodal crossbar switch is composed of a plurality of data switches, in which it is possible to perform the continuous operation by avoiding the system down due to a fault of the internodal crossbar switch.

Next, a third embodiment of the invention will be described below.

In the third embodiment, one or more crossbar switches among a plurality of internodal crossbar switches are redundant in the system.

The configuration of the third embodiment of the invention is the same as that of the second embodiment. Referring to FIG. 9, one example of the operation in which the internodal crossbar switch 63 is an operation system and the internodal crossbar switch 64 is a redundant system will be described below.

Since the internodal crossbar switch 63 is the operation system, the configuration information of the node is in a situation where the internodal crossbar switch 63 is only employed. If a fault occurs in the data switch 631 of the internodal crossbar switch 63, a notice that a fault occurs in the internodal crossbar switch 63 is made from the data switch 631 to all the nodes 60, 61, . . . , 62.

The nodes 60, 61, . . . , 62 receiving the notice issues a stop instruction of the internodal data transfer instruction to the software, while it issues a notice that a fault occurs in the internodal crossbar switch 63 to all the data switches 630, 631, . . . , 632 on the side of the internodal crossbar switch 63.

Receiving the notice, the data switches 630, 631, . . . , 632 of the internodal crossbar switch 63 changes the status of the diagnosis device 635, 636, 637 to the state where a fault occurs in the internodal crossbar switch 63. Then, the data switches 630, 631, . . . , 632 reset the beginning state remaining within the internodal crossbar switch 63, and make the preparation for reincorporating the data switch 631 which is recovered from the fault.

Thereafter, if the repair of the data switch 631 where the fault occurs is completed, and ready to be incorporated, the data switch 631 issues a repair completion notice to the nodes 60, 61, . . . , 62, which send this notice to all the data switches 630, 631, . . . , 632 of the internodal crossbar switch 63.

The data switches 630, 631, . . . , 632 of the internodal crossbar switch 63 receiving the repair completion change the status from a fault state to a standby state where the internodal crossbar switch 64 is at standby as the redundant system.

By making this status change, the internodal crossbar switch 63 that has been the operation system before is operated as the redundant system.

On the other hand, the nodes 60, 61, 62 issue an operation system notice for changing to the operation system at the moment of fault notification in the data switch 631 of the internodal crossbar switch 63 to the data switches 640, 641, . . . , 642 of the internodal crossbar switch 64, where the status of each data switch of the internodal crossbar switch 64 is changed from the redundant system to the operation system, and a status change completion notice is sent to all the nodes 60, 61, . . . , 62.

The nodes 60, 61, . . . , 62 receiving the completion notice from the data switches 640, 641, . . . , 642 of the internodal crossbar switch 64 change the configuration information to enable the internodal data transfer with the internodal crossbar switch 64 alone. Then, the nodes 60, 61, . . . , 62 issue an internodal transfer resumption instruction to the software, and restart the multi-node operation employing the internodal crossbar switch 64 alone.

As described above, in the third embodiment, the internodal crossbar switch of the operation system and the standby internodal crossbar switch of the redundant system are provided, whereby it is possible to perform the continuous operation of the multi-node system without giving rise to the system down and without lowering the internodal data transfer performance even if a fault occurs in the internodal crossbar switch.

The operation of the internodal crossbar switch 13 of the invention can be implemented by hardware. Also, the above functions may be implemented by software by executing a switch program 300 on the internodal crossbar switch 13 that is a computer processing apparatus. This switch program 300 is stored in a magnetic disk, a semiconductor memory, or any other recording medium, loaded from the recording medium into the internodal crossbar switch 13 and executed to control its operation to implement each function.

Also, the operation of the node 11 of the invention may be implemented by hardware. That is, the above functions may be implemented by software by executing a node program 100 on the node 11 that is a computer processing apparatus. This node program 100 is stored in a magnetic disk, a semiconductor memory, or any other recording medium, loaded from the recording medium into the node 11, and executed to control its operation to implement each function.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A multi-node system including a plurality of nodes and a plurality of internodal crossbar switches each having a data switch for transmitting transfer data from a node to a node of transfer destination, and making a data transfer between the nodes via the internodal crossbar switches,
wherein, if a fault occurs in the data switch of one of the internodal crossbar switches, the system is configured to make data transfer between the nodes via any other internodal crossbar switch than the internodal crossbar switch having the data switch where the fault occurs, without employing the crossbar switches in a redundant arrangement,
wherein in the multi-node system, a number of said plurality of nodes is equal to a number of said plurality of internodal crossbar switches, and
wherein, when there is no fault in the data switch of any of the internodal crossbar switches, the data transfer between the nodes is made via all the internodal crossbar switches.

2. The multi-node system according to claim 1, wherein a plurality of data processing units are provided in each of the nodes, each of the nodes further comprising an internodal controller that initiates the data transfer upon receiving a data transfer instruction from the data processing units.

3. The multi-node system according to claim 2, wherein, if a fault is detected in the data switch of one of the internodal crossbar switches, information that the internodal crossbar switch having the data switch is at fault is notified to the plurality of nodes, and a data transfer instruction from a software operating in the data processing units within the plurality of nodes is stopped.

4. The multi-node system according to claim 3, wherein, upon receiving the information that the data switch of the internodal crossbar switch is at fault, the node transmits the information to internodal crossbar switches without fault, which then changes a configuration of the internodal crossbar switch to a configuration of employing the internodal crossbar switch without fault alone based on the information and notifies a finish information of changing the configuration of the internodal crossbar switch to the plurality of nodes.

5. The multi-node system according to claim 4, wherein, upon acquiring the finish information of changing the configuration, the system changes a transmission destination of the data transfer instruction to an internodal controller connected to the internodal crossbar switches without fault, and then instructs the software operating in the data processing units of the plurality of nodes to transfer the data between the nodes.

6. The multi-node system according to claim 3, wherein, in transmitting the information that the internodal crossbar switch having the data switch is at fault to the plurality of the nodes, the information is transmitted via a data transfer path for use to transfer the data between the crossbar switch and the node.

7. The multi-node system according to claim 2, wherein the data transfer takes place upon either:
an instruction of reading data from a memory provided in a local node that is a node where the data processing unit issuing a data transfer instruction is provided, transferring the read data from the local node to a remote node that is a partner of the local node in the data transfer, and writing it into a memory provided in the remote node, or an instruction of reading data from the memory provided in the remote node, transferring the read data from the remote node to the local node, and writing it into the memory provided in the local node.

8. An internodal crossbar switch employed in a multi-node system according to claim 1, comprising:
a data switch connected to a plurality of nodes and transmitting transfer data from a node to a node of transfer destination;
a diagnosis device for performing a fault processing; and
a status communication control unit for communicating status information with the nodes,
wherein, if the diagnosis device detects a fault occurring in the data switch, the diagnosis device instructs the status communication control unit to indiscriminately and directly notify each of the plurality of nodes that the internodal crossbar switch having the data switch is at fault, and the status communication control unit notifies the status information to said each of the plurality of nodes, and
wherein if the internodal crossbar switch is at fault, the diagnosis device changes a configuration of the system to employ only an internodal crossbar switch without fault, whereby a termination of changing the configuration of the system is notified from the status communication control unit to the plurality of nodes.

9. A node employed in a multi-node system according to claim 1, comprising:
an internodal controller connected to a plurality of internodal crossbar switches each having a data switch for transferring transfer data to a transfer destination and initiating a data transfer upon receiving a data transfer instruction;
a status communication control unit for communicating status information with an internodal crossbar switch, a plurality of data processing units; and
a diagnosis device, placed within said node, said diagnosis device performing a fault processing only for said node rather than being shared by a plurality of nodes,
wherein, upon receiving information of a fault state from one of the internodal crossbar switches, the status communication control unit notifies the fault state to the diagnosis device, and the diagnosis device stops a transfer instruction from a software operating in data processing units.

10. The node according to claim 9, wherein the diagnosis device issues an instruction of transmitting the information of the fault state to internodal crossbar switches without fault, and the status communication control unit transmits the information of the fault state to internodal crossbar switches without fault based on the instruction.

11. The node according to claim 9, wherein, upon receiving the information that the change of configuration for employing only the internodal crossbar switch without fault is finished from the internodal crossbar switch, the diagnosis device changes a transmission destination of the data transfer instruction to an internodal controller connected to the internodal crossbar switches without fault, and then instructs the data transfer between the nodes.

12. The node according to claim 11, wherein, if the diagnosis device changes the transmission destination of the data transfer instruction to the internodal controller connected to the internodal crossbar switches without fault, a processing internodal controller decision circuit within the data processing units decides the internodal controller that transmits the data transfer instruction.

13. A signal bearing storage medium tangibly embodying a switch program of machine-readable instructions executable by digital processing apparatus, the program being executed on an internodal crossbar switch in a multi-node system according to claim 1 including:
- a data switch connected to a plurality of nodes and transmitting transfer data from a node to a node of transfer destination,
- a diagnosis device for performing a fault processing, and
- a status communication control unit for communicating status information with the nodes,
- wherein if the diagnosis device detects a fault occurring in the data switch, the diagnosis device instructs the status communication control unit to indiscriminately and directly notify each of the plurality of nodes that the internodal crossbar switch having the data switch is at fault, and the status communication control unit notifies the status information to said each of the plurality of nodes, and
- wherein upon receiving the information from the plurality of nodes, the diagnosis device changes a configuration of the system to employ only internodal crossbar switches without fault, and the status communication control unit notifies the plurality of nodes that the change of the configuration of the system is finished.

14. A signal bearing storage medium tangibly embodying a node program of machine-readable instructions executable by digital processing apparatus, the program being executed on a node in a multi-node system according to claim 1 including:
- a status communication control unit for communicating status information with an internodal crossbar switch, a plurality of data processing units; and
- a diagnosis device, placed within said node, for performing a fault processing, said diagnosis device performing said fault processing only for said node rather than being shared by a plurality of nodes;
- wherein upon receiving information of fault state from an internodal crossbar switch, the status communication control unit notifies the fault state to the diagnosis device, which then stops a transfer instruction from a software operating in the data processing units.

15. The signal bearing storage medium according to claim 14, wherein the diagnosis device issues an instruction of transmitting the information of fault state to an internodal crossbar switch without fault, and the status communication control unit transmits the information of fault state to the internodal crossbar switch based on the instruction.

16. The signal bearing storage medium according to claim 14, wherein upon receiving the information that the change of a configuration for employing only the internodal crossbar switch without fault is finished from the internodal crossbar switch, the signal bearing medium embodies the node program which causes the diagnosis device to change the transmission destination of the data transfer instruction to an internodal controller connected to the switch, and instruct the data transfer between the nodes.

* * * * *